Oct. 3, 1950            H. BUHLER            2,524,649
WIRE CLAMP
Filed Feb. 4, 1948
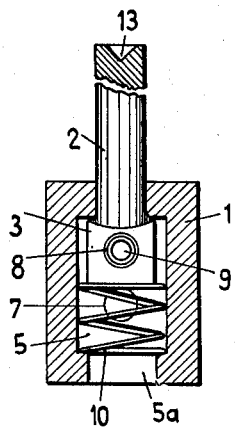
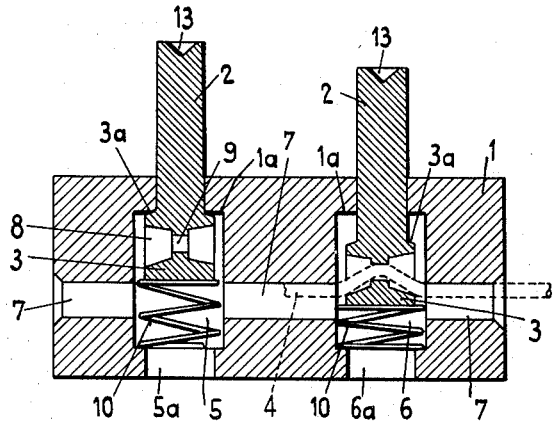

Patented Oct. 3, 1950

2,524,649

UNITED STATES PATENT OFFICE 2,524,649

WIRE CLAMP

Heinrich Bühler, Zurich, Switzerland

Application February 4, 1948, Serial No. 6,228
In Switzerland June 8, 1945

1 Claim. (Cl. 287—75)

This invention has reference to clamps and relates more particularly to clamps for uniting together the ends of a pair of wires such as leads or similar strands.

Devices of this type already exist and are so built that the ends of the wires or leads are held in the clamp body by members urged by a spring, bores being provided in said members for retaining the wire ends. However in such devices the clamping is insufficient because it results from a mere pinching action.

The primary object of this invention is to provide a clamp belonging to the aforesaid type but having a novel or improved construction including at least one sliding member urged by a spring and housed in a recess of the clamp body, said members having a bore which, while said sliding member is in operative position, is aligned with respect to a companion bore in the clamp and cooperates with a pressure member having such a shape as to crimp the engaged wire transversely, thereby firmly holding the same.

Another object of the invention is to provide a wire end clamp as aforesaid including at least one pressure member the recesses of which are flared outwardly and separated by a middle portion forming a web or bridge capable of firmly holding in crimped condition the engaged wire end, thus preventing the same from being pulled out from the clamp.

Other objects and advantages of the invention will come out of the continuation of this description.

In the accompanying drawing which illustrates the invention and forms a part of the present disclosure:

Figure 1 is a transverse sectional view of the improved wire end clamp.

Figure 2 is a longitudinal sectional view of said clamp.

In the illustrated embodiment, the clamp comprises a body 1 and a pair of compression elements 3 urged by springs and respectively adapted firmly to hold one end 4 of a wire such as a lead wire.

The body 1 of the clamp is provided with vertical recesses 5, 6 and with a longitudinal bore 7 extending through it from end to end at right angles to said recesses and adapted to receive the wire ends 4, the cross sectional area of said bore being larger than that of said wire ends. In each recess is slidably housed a spring-urged element 3 fitted with a shank 2 guided through suitably sized holes in the top part of said body, said shank 2 being of smaller cross sectional size than the compression elements, thereby defining flanges 3a which abut, in inoperative position, against shoulders 1a formed by the inner walls of the recesses 5, 6 where they communicate with said holes.

The spring-urged elements 3 have recesses 8 which taper inwardly of said elements and define between them a bridge or web portion 9 midway from the opposite side faces of the elements. Compression springs 10 are housed in the recesses 5, 6 underneath the elements 3 which cooperate with them. Each spring has one of its ends in abutting relation with an element 3 and its opposite end abutted to shoulders defined around insertion holes 5a, 6a arranged co-axially to the recesses 5, 6.

The elements 3 which exert a compressive stress upon the springs 10 are prevented from rotating in the recesses 5, 6 by conventional guiding means (not shown).

The shanks 2 of the spring-urged elements 3 are provided on their top faces with nicks 13 with which tools adapted to exert a thrust on said elements can engage.

Assuming a pressure to be exerted upon the shank 2 of a compression element 3, for example by means of a pointed tool the bit of which is inserted into the nick 13, the element 3 is urged downwardly against the resistance of the subjacent spring 10, so that the bore 8 of said element 3 is brought into alignment with the longitudinal bore 7 in the clamp body 1. When the compression elements 3 occupy this position, one end of a wire 4 can be introduced through the bore 7 and through the recesses 8 in the element 3 so as to cause the wire end to reach the middle portion of the bore 7 as shown in dotted lines in Fig. 2. The tapering walls of the recesses 8 bring the wire 4 into engagement with the web 9 and facilitate the insertion of its end. Assuming the shank 2 to be afterwards released, the spring 10 resumes its expanded condition and presses the element 3 upwardly, thereby crimping the part of the wire 4 which is engaged through the web 9 and holding the same firmly as shown by the right hand side of Fig. 2. The crimping of the wire 4 through the web 9 of the recessed element 3 prevents said wire from being disengaged even if a tractional stress of normal magnitude is exerted thereon.

When it is desired to release the wire end 4, the shank 2 of the element 3 is depressed so as to bring the bore 7 and the recesses 8 into coincidence. As there is a sufficient clearance around the wire 4 in the bore 7, it is then fairly easy to extract the wire notwithstanding the corrugation due to its crimped portion.

It will be understood that, instead of forming a web such as 9, the recesses 8 in the elements 3 might have a roughened surface or might be provided with friction generating parts or surfaces for example with teeth or wedge-shaped protuberance or more simply with a roughened or knurled surface so as to exert upon the crimped wire 4 such a frictional resistance as to preclude undue disengagement thereof in normal operative position of the spring-urged element 3.

Minor constructional details might be varied without departing from the scope of the subjoined claim.

What is claimed is:

A clamp for the ends of wires and the like comprising a hollow body having a straight longitudinal bore therethrough for receiving the wire ends, a pair of spring-urged members slidable through said body substantially at right angle to said bore, wire end receiving recesses extending through said members and adapted to come into registration with said longitudinal bore on movement of each of said members, said recesses having oppositely directed flaring entrance openings in each member, a shank extension on each member projecting from the body for movement of said member and having a tool insertion nick, and a flange on each shank forming an abutment cooperating with a shoulder on the inner wall of the hollow body, the recesses in each slidable member being separated by a web having a throttled orifice for the engagement of the wire end, whereby the spring-urged return of said member distorts the wire end by crimping said end into disengageable shape.

HEINRICH BÜHLER.

REFERENCES CITED

The following references are of record in the file of this patent:

UNITED STATES PATENTS

| Number | Name | Date |
|---|---|---|
| 1,379,093 | Freeberg | May 24, 1921 |

FOREIGN PATENTS

| Number | Country | Date |
|---|---|---|
| 193,415 | Switzerland | of 1938 |